Patented Mar. 13, 1923.

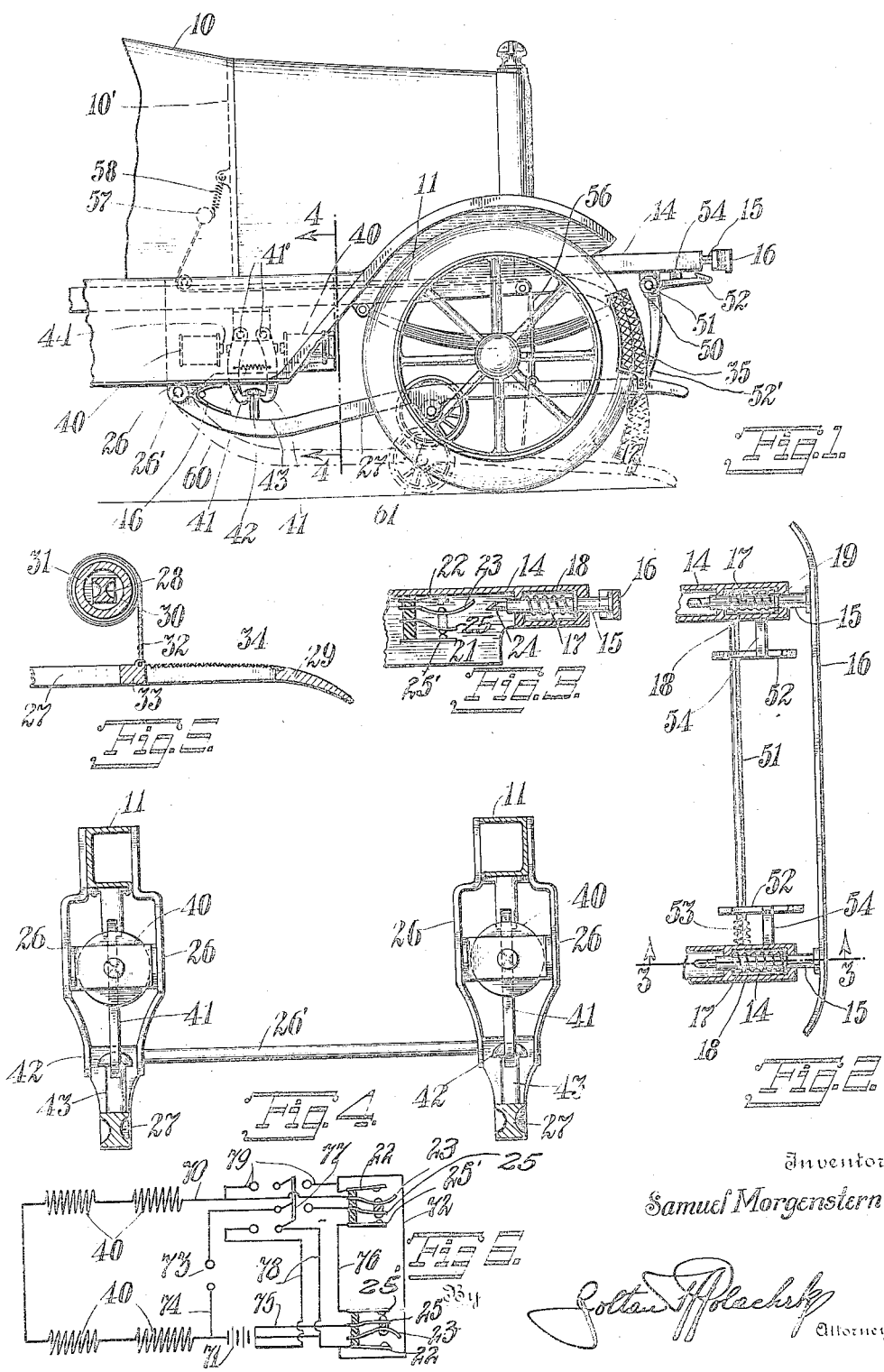

1,448,459

UNITED STATES PATENT OFFICE.

SAMUEL MORGENSTERN, OF BROOKLYN, NEW YORK.

AUTOMOBILE SAFETY DEVICE.

Application filed November 18, 1922. Serial No. 601,924.

*To all whom it may concern:*

Be it known that I, SAMUEL MORGENSTERN, a citizen of Czechoslovakia, residing at Brooklyn, in the county of Kings and State of New York, have invented certain new and useful Improvements in Automobile Safety Devices, of which the following is a specification.

This invention relates generally to vehicle fenders, being intended more particularly for application to automobiles, motor trucks or the like.

The invention has for a general object to provide a novel and improved fender which is automatically lowered when a bumper bar carried in front of the vehicle is struck.

More specifically speaking the invention has for an object to provide electrically controlled automatic release means for the fender, a further object relating to the provision of means whereby the fender may be restored by the driver to normal position, after being lowered, without the necessity of the driver leaving his seat.

For further comprehension of the invention, and of the objects and advantages thereof, reference will be had to the following description and accompanying drawings, and to the appended claims in which the various novel features of the invention are more particularly set forth.

Fig. 1 of the drawings is a partial side view of an automobile equipped with my improved fender.

Fig. 2 is a detail view, part plan and part horizontal section, showing the bumper structure.

Fig. 3 is a detail longitudinal vertical sectional view taken on the line 3—3 of Fig. 2.

Fig. 4 is a detail transverse sectional view taken on the line 4—4 of Fig. 1.

Fig. 5 is a detail longitudinal sectional view illustrating the winding apron.

Fig. 6 is a diagram of the electric circuit.

In the drawings the body of an automobile of ordinary construction is indicated at 10, the main side frame members of the chassis being shown at 11 and one of the front wheels being indicated at 12. According to my invention a pair of arms 14 are fixed to and project longitudinally from the front ends of the side frame members 11. Slidably engaged in the forward ends of these arms and projecting forwardly therefrom are pins 15 having a bumper bar 16 fixed on their forward ends. These pins 15 are urged forwardly by springs such as 17 located in recesses such as 18 in the arms 14 and bearing against flanges such as 19 on the pins.

The intermediate portion of each arm 14 is channeled on its underside as at 21 and in this channel a pair of suitably insulated contact springs 22, 23 are mounted. Fixed on the rear end of each pin 15 is a beveled nose 24 of insulating material which is adapted, when the bumper bar 16 is moved rearwardly to engage the upwardly inclined end of contact 23 and move it into engagement with contact 22.

A second pair of spring contacts 25, 25' are mounted under the contact 23 and are normally held in engagement with each other by the latter, the contact 25 raising automatically from contact 25' when contact 23 is lifted.

Fixed to and depending from the sides of the frame members 11 are pairs of cheek plates 26 which are located slightly rearward of the front wheels 12. Extending between and journaled in the respective pairs of plates is a transverse shaft 26' to which is fixed, one between each pair of plates, the arms 27 which extend forwardly under the front axle 28 and may be united adjacent their front ends by a crossbar 29. Upon the front axle 28 of the automobile a series of collars such as 30 are fixed and serve to rotatably support an enclosing hollow roller 31 to which is attached one end of a fender apron 32 whose opposite end is attached to a second crossbar 33 extending between the arms 27 at a distance behind the front crossbar 29. An apron 34 may cover the space between these crossbars. A spring may be applied to roller 31 in a well known manner to rotate the same in a direction to wind the apron 32 thereon. Fixed to and projecting upward from the fender arms 27 are curved elements such as 35 which act as guards in front of the wheels 12.

Mounted between each pair of cheek plates is a pair of electro-magnets 40 axially alined in opposed relation to one another. Pivoted as at 41' between each pair of cheek-plates is a pair of latches 41 having hooked lower ends adapted to engage under opposed sides of a head 42 formed on the upper end of a rod 43 projecting upward from each fender arm 27. These latches 41 extend between the electro-magnets 40 and have the armatures 44 of the latter fixed thereon. The coils of these electro-magnets are wired to the contacts 22, 23 so that when the latter are closed the electro-magnets are energized, the latches 41 are freed from the heads 42, allowing the fender to drop, the falling action being hastened by springs such as 46 which press downward on the fender arms 27.

Extending transversely between the arms 14, and journaled at its ends in lugs such as 50 depending from the latter, is a rod 51 to which is fixed a pair of forwardly projecting latches 52 adapted to engage under the fender bar 16 when the latter is moved rearwardly by striking an object, and hold the same in such position, maintaining the contacts 22, 23 closed. The latches 52 are resiliently urged to locking position by a spring 53 coiled around and acting on the rod 51, upward movement being limited by means of fingers 54 extending laterally therefrom and engaging under the arms 14. The latches 52 are provided with downwardly projecting tail-pieces such as 52' which have beveled lower ends adapted to be engaged by the crossbar 29, by giving the fender an upward movement slightly beyond its normal raised position, to release said latches.

To raise the fender a cord 56 is attached to one of the arms 27 and leads upward to one of the side frame members 11 and rearwardly along the latter and finally upward behind the dash-board 10', having a handle 57 on its end. The slack in the cord 56 may be taken up by a weak tension spring 58 connected thereto and to the dash-board.

The wiring circuits include a main lead 70 connecting in series the coils 40 with each other and with the contacts 23, through a battery 71 or other source of power, a second lead 72 connecting the contacts 22 to one another. The contacts 25 are connected, through the spark plugs 73, by leads 74, 75 to opposite sides of battery 71, a lead 76 connecting contacts 25' to one another. Suitably mounted on the dash-board is a triple leg hand switch 77. One leg of this triple leg hand switch controls the spark lead 74 while the other legs control shunt leads 78, 79 across the contacts 22, 23, the switch being arranged as to open the spark contact when the shunt is closed and vice versa. It will be apparent that when the nose 24 strikes contact 23 the spark circuit will be opened.

It is believed that the manner of operation of my improved fender will be readily understood from the above description. When the bumper 16 is struck the circuit through the electro-magnets 40 is closed, the latches 41 are released from the heads 42, and the fender drops. To restore the fender the driver pulls on cord 56, lifting the feeder. The latter is moved slightly higher than is necessary for bringing head 41 into engaging relation to the latches, this final upward movement causing the crossbar 29 on the fender to engage the tailpieces 52' of latches 52, which engaged the bumper 16 as the latter moved backward, and release the same. The circuit is thus opened and springs such as 60 connected to the pairs of latches 41 moves them into position with their hooked lower ends under the heads 42, the cord 56 being then released. The arms 27 may carry small wheels such as 61 to support the fender when lowered.

Having thus described my invention what I claim as new and desire to protect by Letters Patent of the United States is as follows:

1. In a vehicle, a hinged fender element, means holding said fender element raised, an electro-magnetic device for releasing said means, a movable bumper bar, contacts adapted to be engaged by said bumper bar to close a circuit through said electro-magnetic device, means adapted to hold said bumper bar in position engaging said contacts, and means adapted to automatically release said last mentioned means when the fender is raised.

2. In a vehicle, a hinged fender element, latches holding said fender element raised, electro-magnets for releasing said latches, a movable bumper bar, and contacts adapted to be engaged by said bumper bar to close a circuit through said electro-magnets, latches adapted to hold said bumper bar in position engaging said contacts, and means adapted to automatically release said last mentioned latches when the fender is raised.

3. In a vehicle, a hinged fender element, latches holding said fender element raised, electro-magnets for releasing said latches, a movable bumper bar, and contacts adapted to be engaged by said bumper bar to close a circuit through said electro-magnets, latches adapted to hold said bumper bar in position engaging said contacts, and means adapted to automatically release said last mentioned latches when the fender is raised, comprising tail-pieces on said latches adapted to be engaged by said fender.

4. In a vehicle, a hinged fender element, latches holding said fender element raised, electro-magnets for releasing said latches, a movable bumper bar, and contacts adapted to be engaged by said bumper bar to close a circuit through said electro-magnets, latches adapted to hold said bumper bar in position engaging said contacts, and means adapted to automatically release said last mentioned latches when the fender is raised, and a cord attached to said fender for raising the same.

In testimony whereof I have affixed my signature.

SAMUEL MORGENSTERN.